(12) United States Patent
Dedick et al.

(10) Patent No.: US 12,129,345 B1
(45) Date of Patent: Oct. 29, 2024

(54) DEGRADATION OF POLYMERS USING HYDRATED ELECTRONS

(71) Applicants: H2Plus LLC, San Diego, CA (US); H2Plus Operations, LLC, San Diego, CA (US)

(72) Inventors: Gene Dedick, Grand Junction, CO (US); Jared Roberts, Grand Junction, CO (US)

(73) Assignees: H2 Plus LLC, San Diego, CA (US); H2Plus Operations, LLC, San Diego, CA (US)

( * ) Notice: Subject to any disclaimer, the term of this patent is extended or adjusted under 35 U.S.C. 154(b) by 0 days.

(21) Appl. No.: 18/376,774

(22) Filed: Oct. 4, 2023

(51) Int. Cl.
 *C08J 11/14* (2006.01)
(52) U.S. Cl.
 CPC ............ *C08J 11/14* (2013.01); *C08J 2327/18* (2013.01)
(58) Field of Classification Search
 CPC ................................ C08J 11/14; C08J 2327/18
 USPC .......................................................... 588/317
 See application file for complete search history.

(56) References Cited

U.S. PATENT DOCUMENTS

| 11,384,440 | B1 | 7/2022 | Roberts et al. |
| 11,634,823 | B2 | 4/2023 | Roberts et al. |
| 2020/0399147 | A1* | 12/2020 | Yost ...................... C02F 1/4672 |

FOREIGN PATENT DOCUMENTS

| KR | 2013113314 A | * 10/2013 | ............. A61K 31/58 |

OTHER PUBLICATIONS

Wu et al. "Magnetic Field Effects on pH and Electrical Conductivity: Implications for Water and Waste water Treatment," Environmental Engineering Science, vol. 37, No. 11; Jul. 2020 (Year: 2020).*

\* cited by examiner

*Primary Examiner* — Edward M Johnson
(74) *Attorney, Agent, or Firm* — Georgiy L. Khayet

(57) ABSTRACT

Methods and systems for degradation of polymeric substances is provided. An example method includes generating structurally altered gas molecules from water, where the structurally altered gas molecules have a higher probability of attraction of electrons into areas adjunct to the structurally altered gas molecules than molecules of the water. The method further includes infusing the structurally altered gas molecules into a matter containing the polymeric substances, where upon being infused, the structurally altered gas molecules cause a decrease in concentration of the polymeric substances in the matter.

11 Claims, 7 Drawing Sheets

| Test 1 Sample ID | Time of Dosing | Oxidant | Date | Time | Temp (F) | Time filled (s) | PFOA (ppt) | PFOS (ppt) | PFBS (ppt) | PFHxA (ppt) | PFHxS (ppt) | PFNA (ppt) |
|---|---|---|---|---|---|---|---|---|---|---|---|---|
| 2 BLK Mix 1 | None | None | day one | 11:45 | 82.2 | 0 | 340.75 | 149.44 | 0 | 137.46 | 53.85 | 0 |
| 3 Mix 1 | 10 mins | None | day one | 12:00 | 80.5 | 10 | 9.8 | 0 | 0 | 9.8 | 0 | 0 |
| 4 Mix 1 | 40 mins | None | day one | 12:31 | 79.5 | 40 | 453.67 | 100.18 | 0 | 210.78 | 134.53 | 8.12 |
| 5 Mix 1 | 1 hour 10 mins | None | day one | 13:01 | 78.4 | 70 | 0 | 0 | 0 | 0 | 0 | 0 |

| Test 2 Sample ID | Time of Dosing | Oxidant | Date | Time | Temp (F) | Time filled (s) | PFOA (ppt) | PFOS (ppt) | PFBS (ppt) | PFHxA (ppt) | PFHxS (ppt) | PFNA (ppt) |
|---|---|---|---|---|---|---|---|---|---|---|---|---|
| 2 BLK Mix 1 | None | None | day one | 11:45 | 82.2 | 0 | 340.75 | 149.44 | 0 | 137.46 | 53.85 | 0 |
| 6 Mix 1 | None | 15 mins pretreatment | day one | 13:35 | 78.8 | 5 | 63.45 | 12.9 | 0 | 41.3 | 9.25 | 0 |
| 7 Mix 1 | 10 mins | 15 mins pretreatment | day one | 13:49 | 79.8 | 10 | 359.22 | 188.04 | 0 | 99.77 | 71.41 | 0 |
| 8 Mix 1 | 40 mins | 15 mins pretreatment | day one | 14:08 | 79.5 | 40 | 0 | 0 | 0 | 0 | 0 | 0 |
| 9 Mix 1 | 1 hour 10 mins | 15 mins pretreatment | day one | 14:38 | 80 | 70 | 0 | 0 | 0 | 0 | 0 | 0 |

FIG. 4

```
┌─────────────────────────────────────────────────────────────┐
│ Generate structurally altered gas molecules from water,     │
│ wherein the structurally altered gas molecules have a       │
│ higher probability of attraction of electrons into areas    │
│ adjunct to the structurally altered gas molecules           │
│ than molecules of the water 702                             │
└─────────────────────────────────────────────────────────────┘
                              │
                              ▼
┌─────────────────────────────────────────────────────────────┐
│ Infuse the structurally altered gas molecules into a matter │
│ containing polymeric substances, wherein upon being infused,│
│ the structurally altered gas molecules cause a decrease in  │
│ concentration of the polymeric substances in the matter 704 │
└─────────────────────────────────────────────────────────────┘
```

FIG. 7

DEGRADATION OF POLYMERS USING HYDRATED ELECTRONS

TECHNICAL FIELD

This disclosure relates to methods for deploying a structurally altered gas molecule to enhance water treatment and desalination processes. More specifically, this disclosure relates to methods for degradation of polymeric substances.

BACKGROUND

Polymers are widely used in a multitude of applications across various industries. Some polymers can include fluorine in their chemical structure. Polymers that contain fluorine atoms are often referred to as fluorinated polymers or fluoropolymers. These fluorinated polymers are known for their unique properties, including high chemical resistance, low friction, and excellent thermal stability.

An example of polymers that contain fluorine atoms is per- and polyfluoroalkyl substances (PFAS), which are synthetic organofluorine chemical compounds that have fluorine atoms attached to an alkyl chain. Example polymeric PFAS compounds include polytetrafluoroethylene and perfluoroalkoxy alkane. PFAS are widely used in products and various materials due to their enhanced water-resistant properties. Due to their ability to remain in the environment for long periods of time, PFAS are reported to have an environmental impact as well as being toxic to human and animal life. Given these concerns, removal of PFAS from solids, liquids, and gasses is necessary to safeguard public health, protect the environment, and address legal and liability issues associated with their presence in solid, liquid, and gaseous sources. Conventional treatment methods, including activated carbon filtration, ion exchange, and advanced oxidation processes, are not always sufficiently effective in removal of PFAS from solids, liquids, and gasses.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to one example embodiment of the present disclosure, a method for degradation of polymeric substances is provided. The method may include generating structurally altered gas molecules from water, where the structurally altered gas molecules have a higher probability of attraction of electrons into areas adjunct to the structurally altered gas molecules than molecules of the water. The method may further include infusing the structurally altered gas molecules into a matter containing the polymeric substances, where upon being infused, the structurally altered gas molecules cause a decrease in concentration of the polymeric substances in the matter.

According to another embodiment of the present disclosure, a system for degradation of polymeric substances is provided. The system can include a chemical reaction chamber configured to accommodate water. The system may further include a magnetic field generator configured to generate a focused magnetic field. The system may further include an electric field generator configured to generate an electric field. The electric field and the focused magnetic field drive a chemical reaction in the chemical reaction chamber to generate structurally altered gas molecules from water. The structurally altered gas molecules have a higher probability of attraction of electrons into areas adjunct to the structurally altered gas molecules than molecules of the water. The system may further include a mixing chamber configured to infuse the structurally altered gas molecules into a matter containing the polymeric substances. Upon being infused, the structurally altered gas molecules cause a decrease in concentration of the polymeric substances in the matter.

Other example embodiments of the disclosure and aspects will become apparent from the following description taken in conjunction with the following drawings.

BRIEF DESCRIPTION OF DRAWINGS

Exemplary embodiments are illustrated by way of example and not limitation in the figures of the accompanying drawings, in which like references indicate similar elements.

FIG. 4 shows a table of master test data associated with a method for degradation of PFAS, according to an example embodiment.

FIG. 7 illustrates a method for degradation of PFAS, according to an example embodiment.

DETAILED DESCRIPTION

Figure 1:
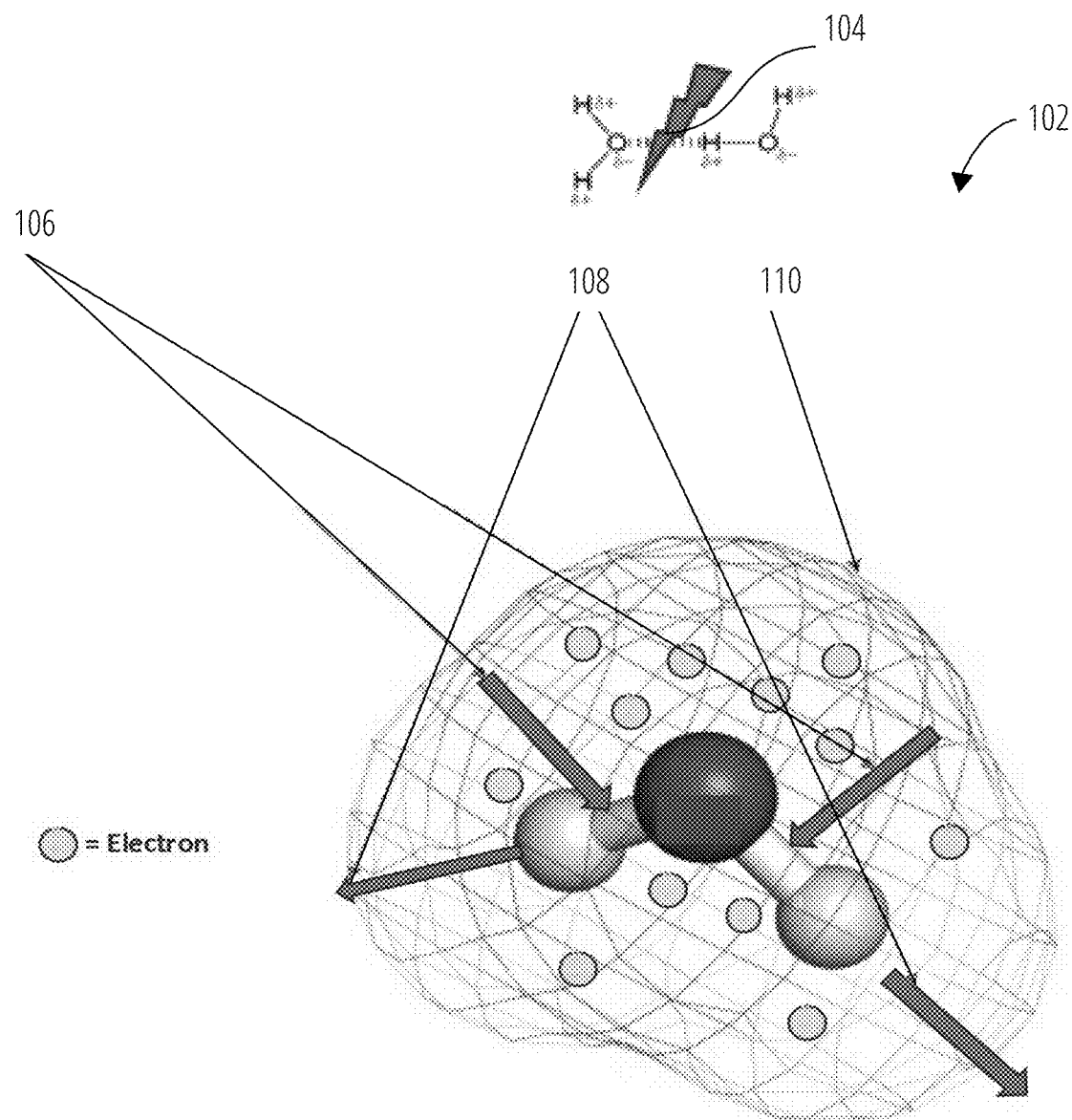
FIG. 1 shows a structurally altered gas molecule deployed in a method for degradation of polymeric substances, according to an example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

Generally, the embodiments of this disclosure relate to methods for degradation of polymeric substances contained in various states of matter with excess hydrated electrons. The method involves diffusing a structurally altered gas molecule into matter that can contains polymeric substances in solid, liquid, and gaseous media. The molecular alterations to generate and deploy the excess and resulting hydrated electrons are performed by a gas molecule generator, also referred to herein as a hydrated electron technology generator or just generator. The electrons are accommodated by lengthening of the H—O bonds from 0.95 Angstroms up to 1.3 Angstrom and decreasing the H—O—H bond angle from 104.5° to as small as 94°. These changes alter the chemical properties of the media that the structurally altered gas molecules may be infused into, furthering the ability of the hydrated electrons to target the polymeric substances. These changes include but are not limited to a decrease in normal pure water pH (from 7.0 to ~6.5), and a shift in redox potential from 0 mV to ~−200 mV. The negative Oxidation Reduction Potential (ORP) at a pH below 7 in the pure water confirms that excess electrons exist independently without the negative ORP effect of dissolved anions in gassed water. Hydrated electrons form when an excess of electrons is injected into liquid water.

In an example embodiment, polymeric substances include fluorine-containing substances. In some example embodiments, the polymeric substances include PFAS.

The method of the present disclosure generates a gaseous form of restructured water that contains excess electrons. The method includes diffusing hydrated electrons from the surplus electrons in the gas into polymer bearing solids, liquids, and gasses and breaking the critical C—F bonds in the polymer to degrade them into non-harmful reactants.

The method uses conventional water treatment technologies to generate a purified liquid. That liquid is added to a chemical reaction chamber containing an electrolyte solution. This mixture is treated by a focused magnetic field using a magnetic field generator and an electric field to generate an altered, gaseous form of the purified liquid. The generated altered water molecule gas also contains/forms hydrated electrons that have been documented to degrade polymers, such as PFAS. The surplus electrons in the gas molecule form hydrated electrons that can then be deployed directly or mixed into process solids, liquids, or gasses that contain polymers, such as PFAS contaminants to diffuse into these polymers, such as PFAS, break their C—F bonds, and, ultimately, degrade them to non-harmful substances. The method can be used alone or in combination with the efficiency of downstream processes that may include but are not limited to gravity precipitation, ion exchange, selective ion separation, distillation, reverse osmosis (RO) membrane separation, mechanical vapor pressure compression, electrodialysis, and nanofiltration processes to increase their efficiency as well.

Components involved in methods described in the present disclosure include water, water pretreatment equipment, reaction chamber, electrolyte solution, a magnetic field generator, and electricity. Additional components may include pressure regulators, an electrical inverter, solar panels, a gas diffuser for diffusing gas into solid, liquid, or gas (atmosphere) matter that contains polymer, such as PFAS, contaminants.

Water serves as the raw material that the gas product is generated from. Water pretreatment equipment prepares the water for the reaction chamber (using conventional filtration, absorption, and purification). The reaction chamber provides the reaction vessel that holds the electrolyte solution and the purified water for the magnetic field to chemically convert the purified water into an altered gaseous form of the purified liquid. The electrolyte solution provides the medium for the magnetic field to align and impart its energy on the purified water mixed in with the electrolyte solution to chemically generate the altered gaseous form of said water. This gas contains hydrated electrons and diffuses the hydrated electrons. In an example embodiment, the magnetic field generator may include one of the following: earth magnets, solenoids, electromagnets, and so forth. The magnetic field generator creates magnetic field to drive the chemical reaction that generates the altered form of the gaseous water and the hydrated electrons. Once generated, the gas can be diffused into the upstream and or a recycled feed stream.

Addition of high efficiency gas to liquid deployment system may optimize the desired physical diffusion and result chemical kinetics/thermodynamic benefits.

Conventional energy intensive, time-consuming ultraviolet oxidation and sedimentation processes typically provide mediocre results at considerable costs with many of the polymers, such as PFAS, contaminants still intact. The resulting precipitates require hazardous disposal. The method of the present disclosure provides the rapid contaminant removal and resulting benefits as described below.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

This application makes reference to U.S. patent application Ser. No. 17/487,613, filed on Sep. 28, 2021, now U.S. Pat. No. 11,384,440, and to U.S. patent application Ser. No. 17/743,632, filed on May 13, 2022, now U.S. Pat. No. 11,634,823, the subject matter of which is incorporated herein by reference in its entirety for all purposes. Processes and systems described herein may be better understood in light of the concepts found in these references.

FIG. 1 shows a structurally altered gas molecule 102 deployed in the method of the present disclosure. The structurally altered gas molecule deployed in the method of the present disclosure may include a structurally altered gas molecule generated by processes described in U.S. Pat. Nos. 11,384,440 and 11,634,823.

During the alterations, hydrogen bonds 104 are broken to allow a gaseous single molecule form of water to exist and enable the following adjustments: 1) a bond angle 106 is decreased; 2) oxygen-hydrogen covalent bond length 108 is increased; 3) adjustments allow room for more electrons in probability spheres 110. Per the molecular orbital theory (MOT) e, small molecules like water can adjust electron energy levels around the probability spheres. The MOT states that not just the atoms themselves but the entire molecule shares electrons now.

As for the structurally altered gas molecule 102, the molecular alterations include lengthening of the H—O bonds from 0.95 Angstroms up to 1.3 Angstrom and decreasing the H—O—H bond angle from 104.5° to as small as 94°. These changes alter the chemical properties of the water that the gas may be infused into. These changes include a decrease in normal pure water pH (from 7.0 to ~6.5), and a shift in redox potential from 0 mV to ~−200 mV. This gas has been diffused into normal pure water where it has been demonstrated that the infused gas imparts some of its above-described properties to the un-gassed normal pure water.

The gas, i.e., structurally altered gas molecules, has been diffused into normal pure water where it has been demonstrated that the gas imparts its above-described properties to the un-gassed normal pure water. The restructuring of normal water molecules by diffusion of the gas into it has shown the following observed alterations in the gas diffused water allowing the accommodation of excess electrons. The first alteration is reduction in intermolecular hydrogen bonding between water molecules in liquid phase. Hydrogen bonding in water is a dynamic attraction between positively charged hydrogen atoms of one water molecule and negatively charged oxygen atoms of another water molecule. This occurs because of the difference in electronegativity between hydrogen and oxygen atoms.

The second alteration is reduction in the dipole moment of the gas treated water. The dipole moment is a measure of the separation of positive and negative electrical charges within a system. Water has a dipole moment because water has a bent structure and the electronegativity difference between atoms of oxygen and hydrogen.

The third alteration is reduction in the ion-dipole force formed between ions and water. The ion-dipole force is a force of attraction between an ion and a neutral molecule that has a dipole.

The fourth alteration is formation of hydrated electrons from the surplus excess electrons provided by the infusion of the structurally altered gas molecules. Hydrated electrons form when an excess of electrons is injected into liquid water.

These alterations reduce the tendency of the water molecules to "clump" through hydrogen bonding, and its dipole moment. The alterations also provide a reduction in the ion-dipole force formed between ions and water to facilitate a surplus availability of electrons. With these changes provided by the method of the present disclosure, the desirable effects on the chemical kinetics (speed of reaction) and thermodynamics (how far to completion the reactions will go) in the degradation of PFAS have been demonstrated and documented in experiments. The method generates enough electrons in proximity to the substances to drive the accompanying degradation reactions to completion. Results from the experiment conclude a significant reduction in PFAS.

The gas, i.e., structurally altered gas molecules, can be deployed directly to public and private influent water, industrial process water and wastewater streams to enhance the performance of the existing technology and in some cases eliminate the need for existing sub-components and their corresponding capital and operational costs.

Figure 2:
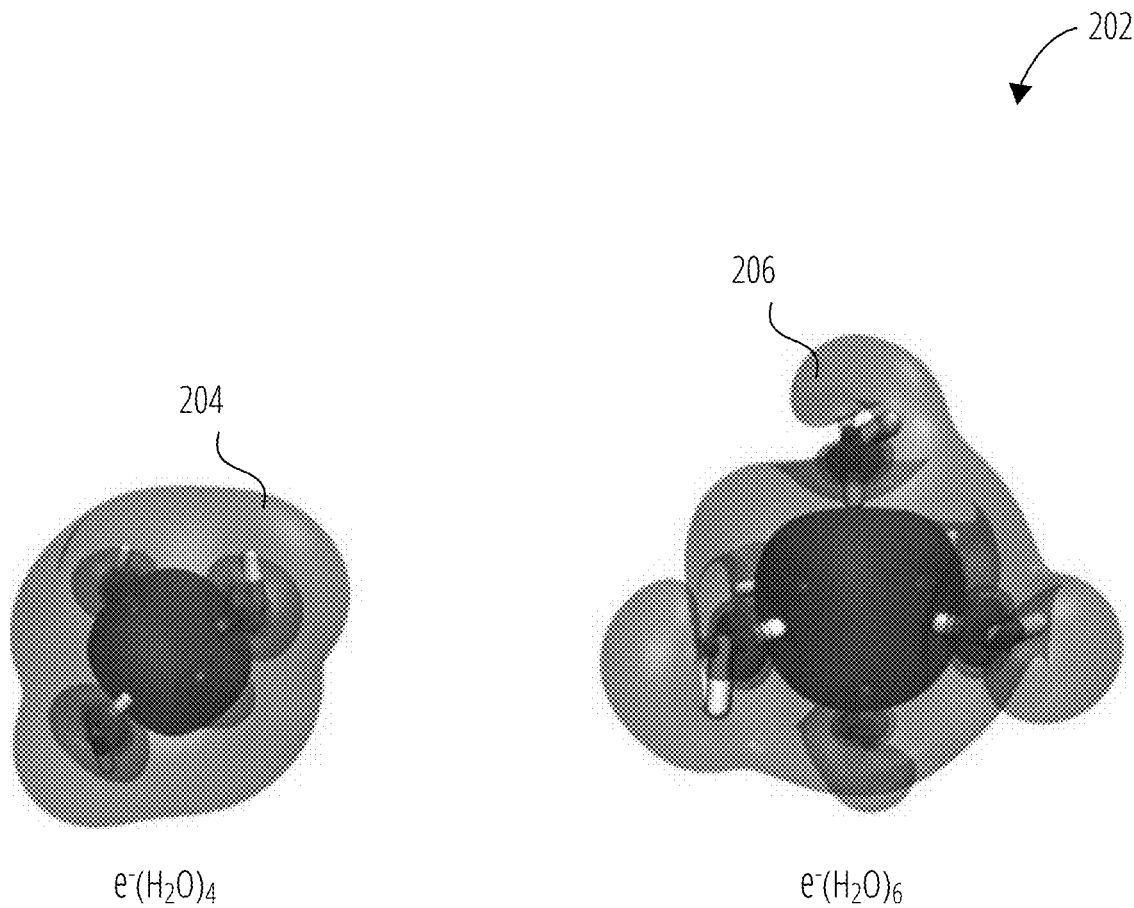
FIG. 2 illustrates hydrated electrons, according to an example embodiment.

FIG. 2 is a diagram 202 showing examples of hydrated electrons. The gas of the present disclosure contains the surplus electrons and resulting hydrated electrons. The method of the present disclosure weakens the affinity of the waters of hydration around the hydrated electron giving it access to the carbon-fluorine (C—F) bonds in PFAS and degrading the PFAS to non-harmful compounds. FIG. 2 shows four water molecules 204 plus an excess electron and six water molecules 206 plus an excess electron.

Figure 3:
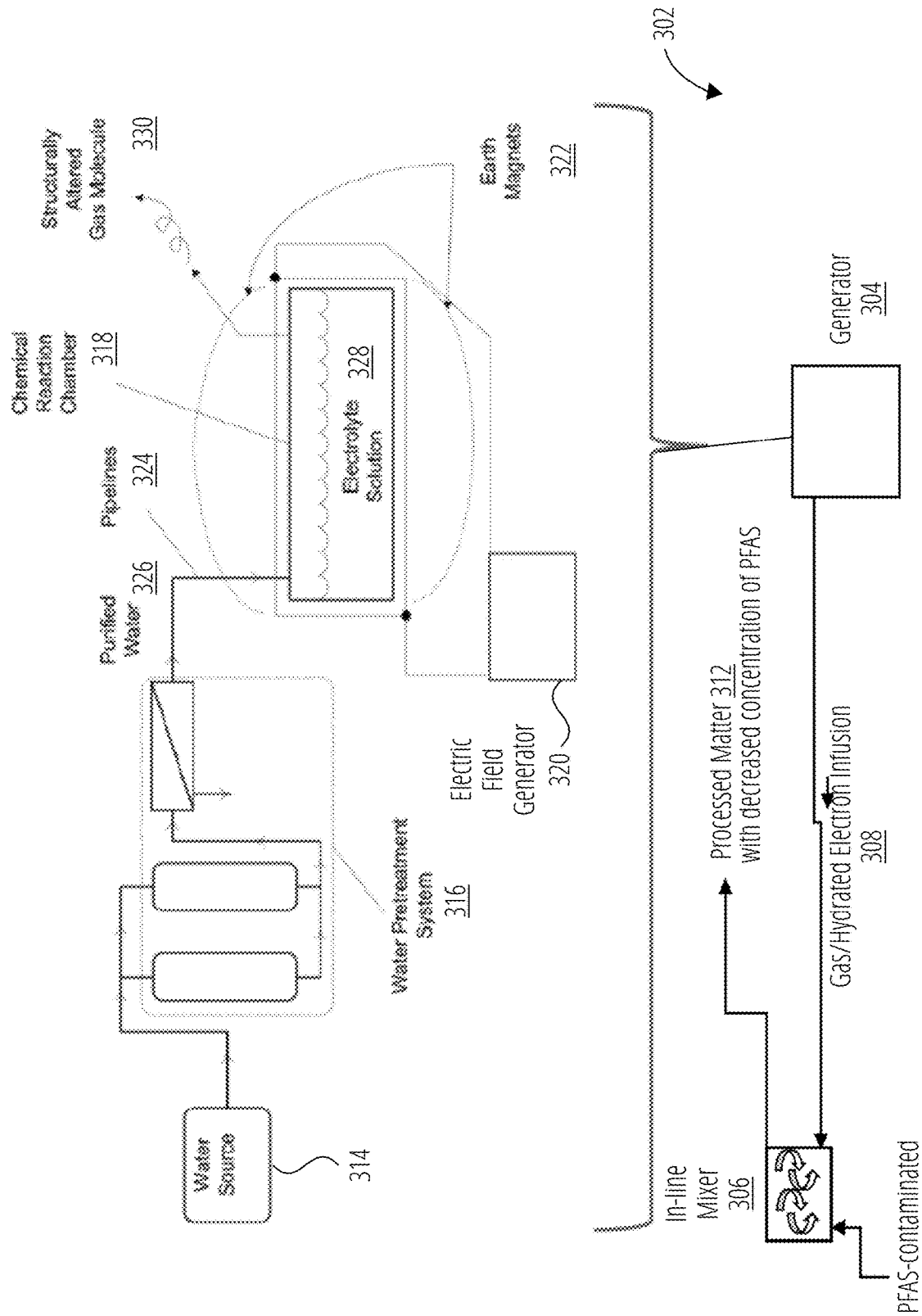
FIG. 3 is a diagram showing a system for degradation of polymeric substances, according to an example embodiment.

FIG. 3 is a diagram showing a system 302 for degradation of polymeric substances, according to an example embodiment. The system 302 may include a hydrated electron technology generator shown as a generator 304 and a mixing chamber shown as an in-line mixer 306.

A matter 310 contaminated with polymeric substances, such as PFAS, may be provided to the mixer 306. The water infused with structurally altered gas molecules generated by the generator 304 may be provided in form of gas/hydrated electron infusion 308 to the mixer 306. The mixer 306 may be configured to infuse the structurally altered gas molecules from the gas/hydrated electron infusion 308 into the matter 310 containing the polymeric substances, such as PFAS. Upon infusing the structurally altered gas molecules into the matter 310 to cause a decrease in concentration of the polymeric substances, such as PFAS, in the matter 310, processed matter 312 with decreased concentration of polymeric substances, such as PFAS, may be produced.

The generator 304 is an example system for generating a structurally altered gas molecule, according to an example embodiment. The generator 304 may include a water source 314, a water pretreatment system 316, a chemical reaction chamber 318, an electric field generator 320, the magnetic field generator such as earth magnets 322, and pipelines 324. The generator 304 may also include pressure regulators. The electric field generator 320 may include an electrical inverter and solar panels.

The water source 314 may provide water as a raw material for generating the gas molecule product. The water pretreatment system 316 may prepare the water for the chemical reaction chamber 318. The water pretreatment system 316 may include a filtration system, an absorption system, and a purification system to produce the purified water 326.

The chemical reaction chamber 318 may be configured to accommodate water and may contain an electrolyte solution 328. The electrolyte solution 328 can be made using a mixture of a hydroxide salt and an acid salt. The purified water 326 can be provided to the chemical reaction chamber 318. The earth magnets 322 may generate a permanent focused magnetic field. The electric field generator 320 may generate an electric field. The focused magnetic field and the electrical field may drive a chemical reaction that generates the structurally altered gas molecule 330 from the purified water supplied into the chemical reaction chamber 318. The electrolyte solution 328 may provide a medium for the focused magnetic field to align and impart energy of the focused magnetic field on the purified water mixed in with the electrolyte solution and, thereby, chemically generate the structurally altered gas molecule 330 from the purified water 326. The temperature in the chemical reaction chamber 318 can be from 60 degrees to 120 degrees Fahrenheit. The pressure in the chemical reaction chamber 318 can be from 1 atmosphere to 40 pounds per square inch gauge (psig). The structurally altered gas molecule 330 may have a higher probability of attraction of electrons into areas adjunct to the structurally altered gas molecule 330 than molecules of the water.

The structurally altered gas molecule 330 can be 99.9% hydrogen and oxygen combination in two parts of hydrogen to one part of oxygen ratio at the Standard Temperature of 68 degrees of Fahrenheit and Pressure of 1 atmosphere (STP). The structurally altered gas molecule 330 may have the O—H bond length between 0.95 and 1.3 angstroms and the H—O—H bond angle between 94 degrees and 104 degrees.

The molecular weight of the structurally altered gas molecule 330 can be between 12.14 and 12.18 atomic mass units (AMUs) at STP. In comparison, the molecular weight of pure water vapor is 18 AMUs at STP. At STP, the relative density of the structurally altered gas molecule 330 compared to dry air is 41.18%-42.00%. In comparison, relative density of pure water vapor compared to dry air is 62.19%. The structurally altered gas molecule 330 may remain stable at pressure more than 300 psig.

When dissolved in pure water having 2 parts per million (ppm) of total dissolved solids (TDS) at 25 degrees of Celsius, the structurally altered gas molecule 330 may generate an ORP of approximately −50 to −360 mV and a pH of 6.1 to 6.8 in the resulting gas-water mixture. The ORP and pH may remain stable in a closed insoluble vessel for at least 30 days. In comparison, the pure water does not possess a stable negative ORP at a pH below 7.

When dissolved in pure water (2 ppm TDS at 25 degrees Celsius), the structurally altered gas molecule 330 may reduce the concentration of TDS from 2.0 ppm to 1.0 ppm, i.e., the reduction is 50%. Barring contamination, the concentration of TDS remains stable at 1 ppm in a closed insoluble vessel indefinitely.

The changes in structure and properties of the structurally altered gas molecule 330 are caused by changes in electronic structure of the gas structurally altered structurally altered gas molecule 330 due to applying the focused magnetic field and the electrical field to the mixture of the electrolyte solution 328 and purified water 326.

In an example embodiment, a structurally altered gas molecule 330 used in the method for enhancing water treatment and desalination is a combination of two parts of hydrogen and one part of oxygen and produced from water. The structurally altered gas molecule 330 is produced by placing an electrolyte solution in a chemical reaction chamber, adding purified water to the chemical reaction chamber, and applying a focused magnetic field generated by the magnetic field generator and an electric field to a mixture of the purified water and the electrolyte solution to cause generation of the structurally altered gas molecule from the purified water. The temperature in the chemical reaction chamber may be from 60 degrees to 120 degrees Fahrenheit. The pressure in the chemical reaction chamber may be from 1 atmosphere to 40 psig. The structurally altered gas molecule 330 has a hydrogen-oxygen-hydrogen bond angles between 94 degrees and 104 degrees and hydrogen-oxygen bond length between 0.95 Angstrom and 1.3 Angstrom. A hydrogen bonding of the structurally altered gas molecule 330 is neutralized. The structurally altered gas molecule 330, when being dissolved in water, may have two parts per million (ppm) of TDS, causing the TDS to reduce to one ppm. When being dissolved in the purified water, the structurally altered gas molecule 330 and the water may form a solution having a pH ranging from 6.1 to 6.8.

The structurally altered gas molecule 330 may be produced with a mixture of a hydroxide salt and an acid salt as the electrolyte. The structurally altered gas molecule 330 may have a density relative to a dry air of from 41.18% to 42%. The structurally altered gas molecule 330 may be stable at a pressure exceeding 300 psig. The structurally altered gas molecule 330 may have a peak at 600 inverse centimeters in an infrared spectrum.

In an example embodiment, upon dissolving the structurally altered gas molecule 330 in water, a solution of the structurally altered gas molecule 330 and water is produced. The solution may have an oxidation/reduction potential of −50 to −360 millivolts and pH from 6.1 to 6.8. The oxidation/reduction potential and the pH may remain stable for at least 30 days after the solution is placed in a closed insoluble vessel. When infused in water, the structurally altered gas molecule 330 may cause a hydrogen bonding in the water to be neutralized.

An experiment conducted by using the method of the present disclosure. In the experiment, the only variable introduced was the testing with and without the presence of the structurally altered gas molecule. The experiment relates to degradation of PFAS using hydrated electrons deployed using the method of the present disclosure.

The purpose of the experiment is to determine the ability of the gas of the present disclosure, i.e., structurally altered gas molecules, to deploy and diffuse excess electrons and hydrated electrons to degrade PFAS in a PFAS-dosed sample of tap water. The key metrics used for this experiment include volume of the gas per unit time, time of diffusion of the hydrated electrons in a test solution containing PFAS, and reductions in PFAS vs time.

Materials and methods used in the experiment include Cole Parmer 1000 ug/ml PFOS diluted to 526 parts per trillion, oil filled V&S Type-Q (0-15 pounds per square inch absolute (psia)) pressure gauge, Pyrex 2,000 ml graduated volumetric flasks, and a standard stainless steel gas diffuser, 2000 ml. Samples of these were taken and analyzed during a laboratory analysis using EPA Method 1633 Liquid Chromatography/Mass spectrometry LC/MS.

FIG. 4 shows a table 402 illustrating master test data using treatment by the method of the present disclosure. Two 70-minute-long test runs were made in this experiment. Samples were taken at 30-minute intervals. The first 70-minute-long run was made with the infusion of the structurally altered gas molecules. The second test run was made with the infusion of ozone for 15 mins followed by the 70-minute runs using the structurally altered gas molecules. The structurally altered gas molecules were fed at a constant rate of 5.8 liters per minute to the 2000 ml samples. The pressure in the generator was held at 3.25 psi pressure during all runs. Details on the system used in this experiment are shown in FIG. 3.

Figure 5:
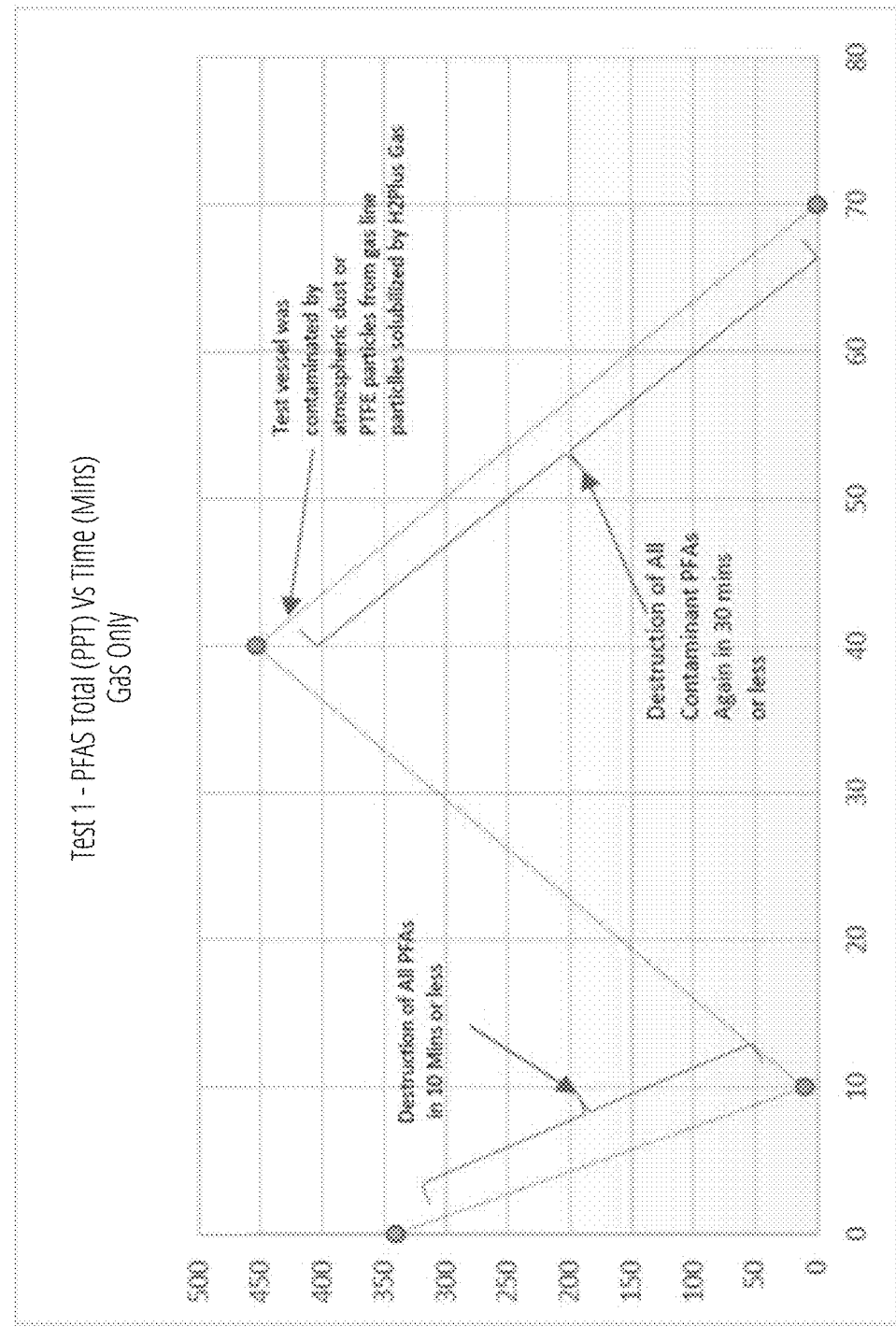
FIG. 5 is a diagram illustrating a test and showing PFAS total (ppt) vs time (mins) when structurally altered gas molecules were supplied, according to the present disclosure.

FIG. 5 is a diagram 502 illustrating Test 1 and showing PFAS total (ppt) vs time (mins) when the gas, i.e., structurally altered gas molecules, was supplied. Destruction of all PFAS particles was achieved in minute 10. In minute 40, a test vessel was contaminated by atmospheric dust or polytetrafluoroethylene (a chemical in the PFAS family) particles from gas line particles solubilized by the gas. In minute 70, destruction of all PFAS particles was achieved.

Conclusions of Test 1. The method of the present disclosure degraded all PFAS from 340.75 PPT to 9.8 PPT in 10 minutes or less. Sometime between 10 and 40 minutes into Test 1, an external airborne or test equipment contaminant entered the test vessel resulting in a PFAS spike to 453.67 PPT. Following this, at some time between 40 minutes and 70 minutes, the method of the present disclosure degraded all the PFAS from 453.67 to below reporting limits for the EPA method 1633 Liquid Chromatography/Mass spectrometry (LC/MS).

Figure 6:
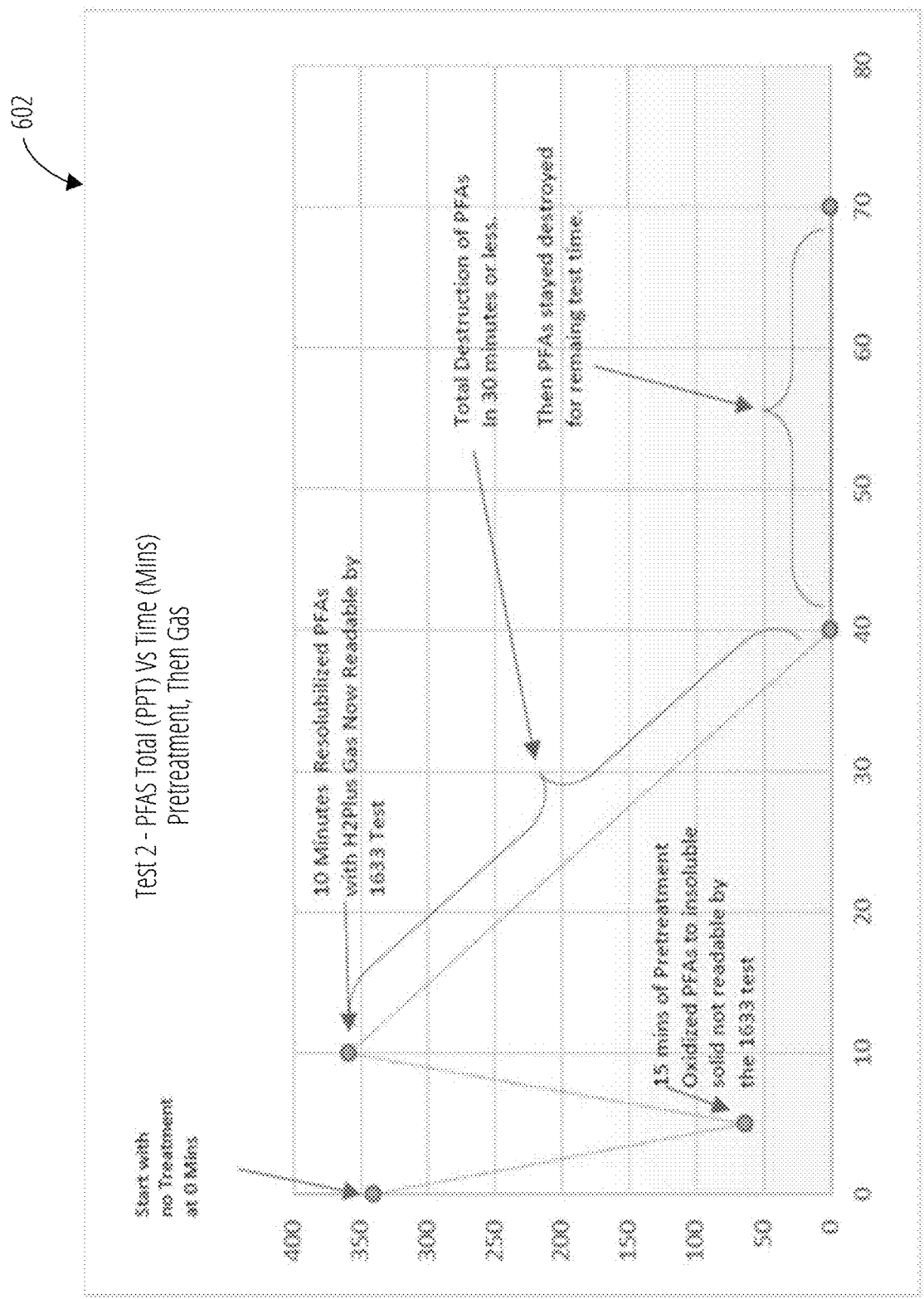
FIG. 6 is a diagram illustrating a test and showing PFAS total (ppt) vs time (mins) when pretreatment was performed and when structurally altered gas molecules were supplied, according to the present disclosure.

FIG. 6 is a diagram 602 illustrating Test 2 and showing PFAS total (ppt) vs time (mins) when pretreatment was performed and then the gas, i.e., structurally altered gas molecules, was supplied. The test started with no treatment. Then, 15 minutes of pretreatment oxidized PFAS to insoluble solid not readable by the 1633 test. After oxidizing the PFAS, the gas was supplied and resolubilized PFAS so that they became readable by the 1633 test. In 30 minutes or less after supplying the gas, total destruction of PFAS was achieved. Then, PFAS stayed destroyed for the remaining test time.

Conclusions of Test 2. The 15-minute oxidizer pretreatment in Test 2 oxidized and converted the PFAS in solution to mostly insoluble species that were difficult to measure with Environmental Protection Agency (EPA) method 1633. This is illustrated by the PFAS reduction from 340.75 PPT to 63.45 PPT at the 5-minute mark on the table 402 and Test 2 diagram 602. Then sometime between 0 and 10 minutes during the addition of the gas in this test, the total PFAS measurable amount increased to 359.22, with the majority of the total PFAS in the form of perfluorooctyl sulfonate. It is believed that the PFAS were ionized and became measurable again at this point. Then sometime in the 30 minutes following, total PFAS were reduced to below reportable limits and remained there at the 70-minute mark when the test ended.

This experiment concludes that the addition of the structurally altered gas molecules has demonstrated the ability to degrade PFAS in tap water in as little as 10 minutes or less.

FIG. 7 is a flow chart of a method 700 for degradation of polymeric substances, according to an example embodiment. In some embodiments, the operations of the method 700 may be combined, performed in parallel, or performed in a different order. The method 700 may also include additional or fewer operations than those illustrated.

In block 702, the method 700 may commence with generating structurally altered gas molecules from water. The structurally altered gas molecules may have a higher probability of attraction of electrons into areas adjunct to the structurally altered gas molecules than molecules of the water. The structurally altered gas molecules may cause breaking of carbon-fluorine bonds in the polymeric substances, such as PFAS.

In an example embodiment, the generation of the structurally altered gas molecules may include placing an electrolyte solution in a chemical reaction chamber, adding purified water to the chemical reaction chamber, and applying a focused magnetic field and an electric field to a mixture of the purified water and the electrolyte solution to cause generation of the structurally altered gas molecule from the purified water. The structurally altered gas molecule may be a combination of two parts hydrogen and one part oxygen. The structurally altered gas molecule may have a hydrogen-oxygen-hydrogen bond angle between 94 degrees and 104 degrees and hydrogen-oxygen bond length between 0.95 Angstrom and 1.3 Angstrom.

In block 704, the method 700 may proceed with infusing the structurally altered gas molecules into a matter containing the polymeric substances. In an example embodiment, the polymeric substances may include fluorine-containing substances. In some example embodiments, the polymeric substances may include PFAS. In an example embodiment, polymeric PFAS may include fluoropolymers, perfluoropolyethers, and side-chain fluorinated polymers. Upon being infused, the structurally altered gas molecules may cause a decrease in concentration of the polymeric substances such as PFAS in the matter. In an example embodiment, the matter is in a gaseous form. In some example embodiments, the matter is in a liquid form. In further example embodiments, the matter is in a solid form.

In an example embodiment, the matter includes water. Upon being infused in the matter, the structurally altered gas molecules may cause a degradation of the polymeric substances such as PFAS in less than 10 minutes. Upon being infused in the water, the structurally altered gas molecules may cause a decrease of pH of the water from 7.0 to 6.5. In some example embodiments, upon being infused in the water, the structurally altered gas molecules may cause a shift in redox potential of the water from 0 millivolts-200 millivolts.

Thus, systems and methods for degradation of polymeric substances have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for degradation of polymeric substances, the method comprising:
generating structurally altered gas molecules from water, wherein the structurally altered gas molecules have a higher probability of attraction of electrons into areas adjunct to the structurally altered gas molecules than molecules of the water; and
infusing the structurally altered gas molecules into a matter containing the polymeric substances, wherein upon being infused, the structurally altered gas molecules cause a decrease in concentration of the polymeric substances in the matter.

2. The method of claim 1, wherein the matter is in a gaseous form.

3. The method of claim 1, wherein the matter is in a liquid form.

4. The method of claim 1, wherein the matter is in a solid form.

5. The method of claim 1, wherein the polymeric substances include one of the following: fluorine-containing substances and perfluoroalkyl and polyfluoroalkyl substances (PFAS).

6. The method of claim 5, wherein the structurally altered gas molecules cause breaking of carbon-fluorine bonds in the polymeric substances.

7. The method of claim 6, wherein, upon being infused in the matter, the structurally altered gas molecules cause a degradation of the PFAS in less than 10 minutes.

8. The method of claim 7, wherein the matter includes water.

9. The method of claim 8, wherein, upon being infused in the matter including the water, the structurally altered gas molecules cause a decrease of pH of the water from 7.0 to 6.5.

10. The method of claim 8, wherein, upon being infused in the matter including the water, the structurally altered gas molecules cause a shift in redox potential of the water from 0 millivolts-200 millivolts.

11. The method of claim 1, wherein:
the generation of the structurally altered gas molecules includes:
placing an electrolyte solution in a chemical reaction chamber;
adding purified water to the chemical reaction chamber; and
applying a focused magnetic field and an electric field to a mixture of the purified water and the electrolyte solution to cause generation of the structurally altered gas molecules from the purified water, wherein:
the structurally altered gas molecules are a combination of two parts hydrogen and one part oxygen; and
the structurally altered gas molecules have a hydrogen-oxygen-hydrogen bond angle between 94 degrees and 104 degrees and hydrogen-oxygen bond length between 0.95 Angstrom and 1.3 Angstrom.

* * * * *